F. B. MAY.
NUTCRACKER.
APPLICATION FILED FEB. 27, 1914.

1,108,920.  
Patented Sept. 1, 1914.

WITNESSES:

INVENTOR  
Frank B. May  
BY  
ATTORNEYS

UNITED STATES PATENT OFFICE.

FRANK B. MAY, OF WHARTON, TEXAS.

NUTCRACKER.

1,108,920.

Specification of Letters Patent. Patented Sept. 1, 1914.

Application filed February 27, 1914. Serial No. 821,387.

*To all whom it may concern:*

Be it known that I, FRANK B. MAY, a citizen of the United States, residing at Wharton, in the county of Wharton and State of Texas, have invented certain new and useful Improvements in Nutcrackers, of which the following is a specification.

This invention relates to new and useful improvements in a nut cracker, and has more particular relation to such devices as are adapted to crush the shells of pecans and other similar hard-shelled nuts.

The object of the invention is to provide a device of the character described, which may be readily attached to a table or other stationary object, and provided with two socket members, between which the nut may be placed, and comprehends also a means for manually moving said members together so as to crush the nut placed therebetween.

A further feature of the device resides in the provision of a resilient member, normally tending to hold said socket members apart, so that the nut may be readily placed in position to be cracked.

With the above and other objects in view, the invention has particular relation to certain novel features of construction, operation and arrangement of parts, an example of which is given in this specification and illustrated in the accompanying drawings, wherein—

Figure 1:
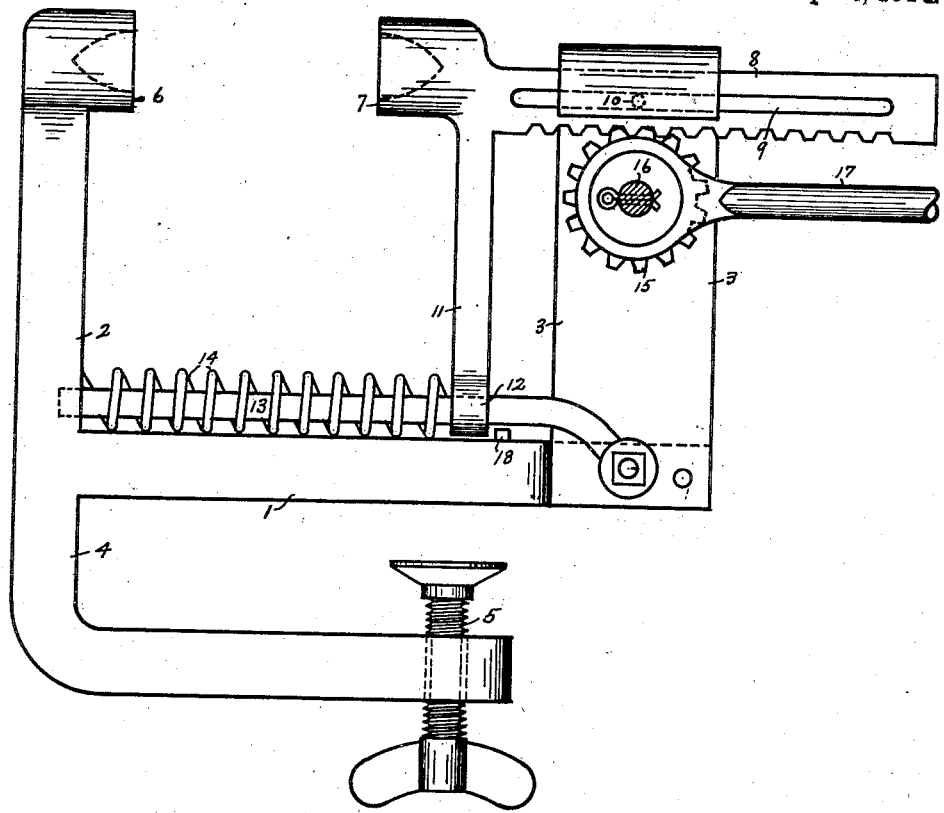
Figure 2:
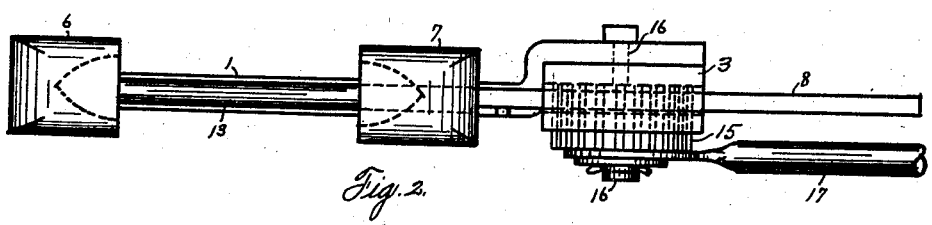

Figure 1 is a side elevation of the complete device, and Fig. 2 is a plan view thereof.

Referring now more particularly to the drawings, wherein like numerals of reference designate similar parts in each of the figures, a U-shaped framework has been provided, consisting of the transverse bar 1, and the upstanding arms 2 and 3, secured to the respective ends thereof. Alined with the arm 2 and integral with the bar 1 is a downwardly extending bracket 4, whose free end is turned and runs parallel with the bar 1, and between which and said bar the edge of a table, or other stationary object may be inserted and to which the device may be secured by means of the thumb screw 5. This screw is threaded through a vertically extending hole in the free end of the bracket 4 and its inner end engages against the object to which the device is to be secured, in the well known manner, and holds the device firmly attached to said stationary object. The upper end of the arm 2 has a socket member 6 which is integral with said arm and opposing which is the movable socket member 7. The facing ends of these socket members are hollowed out so as to conform to the shape of the particular kind of nut to be cracked. The upper end of the arm 3 is bent over, so that its free end extends downwardly and parallel to the body of the arm, forming a groove between said free end and body in which the rack member 8 slides. The inner end of this rack member is integral with and supports the socket member 7. This rack member has an oblong, lengthwise extending slot 9 and a pin 10 extends through said slot and its respective ends are secured to the overturned end and the body, respectively, of the arm 3. Integral with and depending from the inner end of this rack member is an arm 11, whose lower end has a bearing member 12, which is slidable upon the rod 13, whose respective ends are fixed to the respective arms 2 and 3. Surrounding the rod 13 and interposed between the arm 2 and the bearing member 12 is a strong coil spring 14, which operates against said bearing member and tends to normally hold said socket members apart. The underside of the rack member 8 is provided with rack teeth, intermeshing with which is the spur gear wheel 15, which has a bearing on the bolt 16, extending transversely through the arm 3. This spur gear wheel is manually operated by means of the handle 17, which is fixed to the outer side thereof.

In operation, the device is first secured to a fixed support and the nut to be cracked is held so that one end will rest in the socket of the member 6. An upward pull is then exerted on the handle 17, which operates through the gear wheel 15 and the rack member 8 to drive the socket member 7 toward the member 6. The exposed end of the nut will seat in the socket of the member 7 and a slight additional pull on the handle 17 will operate to crush the shell of the nut. The handle is then released and the spring 14 will force the socket member 7 back to its former position. The upper side of the bar 1 carries an upwardly projecting stop 18 which limits the backward movement of the member 7.

What I claim is:—

1. A device of the character described including a framework having two opposing upstanding arms, a socket member carried by the free end of one of said arms and integral therewith, the free end of the other of said arms being bent over and forming a bearing member, a rack member having a lengthwise slot therein and having slidable engagement with said bearing member, a pin carried by said bearing member and extending through said slot, a socket member integral with the inner end of said rack member and opposing said first mentioned socket member, rack teeth carried by said rack member, a spur gear wheel rotatably secured upon one of said upstanding arms, the teeth of which mesh with the teeth of said rack member, a handle secured upon said gear wheel, provided to rotate same, an arm integral with and depending from the inner end of said rack member, a bearing carried by the lower end of said depending arm, a rod whose respective ends are attached to the arms of said framework and which extends through said last mentioned bearing, a spring operating against said last mentioned bearing member and tending to hold said socket members apart, and means for securing said device to a stationary support.

2. A device of the character described including a framework having two opposing upstanding arms, a socket member carried by the free end of one of said arms and integral therewith, the free end of the other of said arms carrying a bearing member, a rack member having a lengthwise slot therein and having slidable engagement with said bearing member, a pin extending through said bearing member and slot, a socket member integral with the inner end of said rack member and opposing said first mentioned socket member, rack teeth carried by the lower side of said rack member, a spur gear wheel rotatably secured upon one of said upstanding arms, the teeth of which mesh with the teeth of said rack member, a handle fixed to said gear wheel and provided to rotate the same, an arm integral with and depending from the inner end of said rack member, a bearing carried by the lower end of said depending arm, a rod whose respective ends are secured to the arms of said framework and which extends through said last mentioned bearing, a coil spring surrounding said rod resting against one of said upstanding arms and opposing said last mentioned bearing member and tending to hold said socket members apart and means for securing said device to a stationary support.

In testimony whereof I have signed my name to this specification in the presence of two subscribing witnesses.

FRANK B. MAY.

Witnesses:
J. M. ELMORE, Jr.,
L. K. TUTTLE.